Patented June 15, 1937

2,084,020

UNITED STATES PATENT OFFICE 2,084,020

COOKED VARNISHES

Herbert A. Endres, Silver Lake, Ohio, assignor to Wingfoot Corporation, Wilmington, Del., a corporation of Delaware No Drawing. Application February 24, 1934, Serial No. 712,800

14 Claims. (Cl. 134—17)

This invention relates to cooked varnishes prepared from condensation derivatives of rubber. It includes the varnishes, the methods of preparing them and coating materials with them and also materials coated with them.

The varnishes of this invention are prepared by cooking a drying oil such as linseed oil with a condensation derivative of rubber. Several such rubber derivatives have been described in the literature. So far the best results have been obtained with a chlorine-containing rubber derivative which may be made as follows:

A rubber cement is prepared by dissolving 10 parts by weight of plasticized pale crepe rubber in 100 parts of benzene. The rubber is plasticized on a mill until a sample measuring $\frac{1}{16}$ of an inch in each direction when placed on a flat plate beneath a flat 10 kg. weight for 3½ minutes in a cabinet heated to a temperature of 70° C. is flattened out to a thickness slightly less than ⅛ inch. This corresponds to a plasticity in the neighborhood of 300 as determined by the Williams plastometer. The properties of the rubber derivative may be varied somewhat by using rubber which has been plasticized to a different extent.

350 gallons of the rubber cement so prepared is placed in a steam-jacketed Day mixer equipped with a reflux condenser and approximately 10% of crystalline hydrated chlorostannic acid (based on the weight of the rubber in the cement) is added. The mixture of cement and chlorostannic acid is heated and agitated for a period of three hours at a temperature near the boiling point of the solvent and preferably between 65 and 80° C. After heating for this time the reaction mixture is sampled every few minutes and the viscosity determined. Heating for an additional three hours or more may be required to produce a product of the viscosity desired. When the desired viscosity has been reached the reaction is terminated by adding water or an alkali.

To determine the viscosity one may employ a Gardner mobilometer, an instrument measuring the viscosity of a sample in terms of the time in minutes required for a plunger of known weight and area to fall a known distance in a cylinder of known volume containing a test sample. The clearance between the plunger and the wall of the cylinder is also known. All readings recorded herein are to be determined at 25° C. A mobilometer having the following dimensions was used in determining the viscosities recorded below.

| | | |
|---|---|---|
| Thickness of plunger disc | 0.066 | Inches |
| Diameter of plunger disc | 1.502 | Do |
| Diameter of plunger shaft | 0.248 | Do |
| Inside diameter of cylinder containing test sample | 1.535 | Do |
| Height of cylinder | 9.0 | Do |
| Length of plunger shaft | 20.0 | Do |
| Distance between the two marks on the plunger shaft | 7.484 | Do |
| Total weight of shaft, top weight and disc | 68.6 | Grams |

When the viscosity of the cement tests 0.02 to 0.03 minute above the desired final viscosity, generally in the range of 0.20±0.10 minute, the reaction is terminated by the addition of alkali to neutralize the reaction mixture (for example 40 grams of sodium hydroxide dissolved in water per pound of chlorostannic acid used) or by dilution with water (as by the addition of ½ pound of water per pound of chlorostannic acid used). The batch is then cooled and filtered. Then the reacted cement is discharged into somewhat more than its own volume of water (for example about 2½ gallons of water for each gallon of reacted cement) at ordinary room temperature and agitated by a propeller rotating at approximately 240 R. P. M. ¾ of an ounce of sodium sulfite or other reducing agent per gallon of water may be added to the water employed for this quenching to prevent oxidation of the reaction product.

It appears that during the reaction of the chlorostannic acid on the rubber tin combines in some way with the rubber and afterwards it is split off when the reaction mixture is quenched in the water. The product obtained on quenching contains chlorine and appears to be a hydrogen chloride addition product of a nucleus having $(C_5H_8)_x$ structure in which more carbon atoms are directly connected than in rubber.

Benzene is removed from the emulsion thus obtained preferably by steam distillation while the emulsion is agitated so that the rubber derivative is precipitated in a finely divided sand-like form. It is then centrifuged, washed with water and dried in a vacuum.

This rubber derivative when cooked in linseed oil forms a desirable cooked varnish. The amount of rubber derivative which is dissolved in the oil may be varied. By the addition of a suitable flux as much as 100 parts by weight of the rubber derivative may be incorporated in 100 parts of alkali refined linseed oil. 50 parts by weight of ester gum (glycerol triabietate) may be used as the flux. Other fluxes which may be employed to aid solution of the rubber derivative in the oil include gum damar, copal gums and rosin. It is not necessary to add a flux but the use of the fluxes mentioned gives a cooked varnish to which more diluent may be added than varnishes which do not contain a flux. Using 50 parts of ester gum as in the above example up to 500% of mineral spirits and up to 100% of linseed oil may be added as a diluent without precipitation of the rubber derivative.

The cooked varnish formed in this way may be dried by baking. If one of the usual driers, such as a cobalt drier, etc. is added, the varnish will dry in air. Less rubber derivative may be used in the formula but the formula above given yields a varnish which gives a good film which is exceedingly hard and very flexible and which is not tacky when dried. It is strongly adherent to metals. Baking improves the gloss and adhesive properties of the film formed, toughens the film and renders it more resistant to scratching and also increases its resistance to gasoline and oils and improves its flexing properties.

A very satisfactory cooked varnish which contains less of the rubber derivative may be made from 20 parts of the rubber derivative, 10 parts of ester gum, 100 parts of alkali refined linseed oil and 50 parts of Varnoline (a high-boiling petroleum distillate). The gum and rubber derivative are intimately mixed on a rubber mill. The linseed oil is heated to 250° F. and the rubber derivative gum mixture is added to the oil and cooked in it. The temperature is raised to 580 degrees F. and heated about 1½ hours until, on sampling, a drop of the cooked mixture remains clear on cooling. This mixture is then cooled to room temperature and the Varnoline added. If the varnish is to be air-dried a drier such as cobalt linoleate or naphthenate is added. Without the drier this varnish bakes dry to the touch in 45 minutes at 300 degrees F. It bakes hard in two hours at 300 degrees F. and gives a very resistant and exceedingly flexible film.

If the rubber derivative is milled for five or preferably ten minutes before cooking it into the oil the solubility of the rubber derivative in the oil is improved and it then gives a clearer film probably due to the breaking up of any oxidized film on the powder. Milling also increases the moisture resistance of the film and improves its resistance to weather. A film prepared from a varnish made of the milled rubber derivative is less liable to crack than a film made from the unmilled derivative.

The cooked varnishes of this invention may be colored, by grinding pigments into them according to the usual practice, or preferably by milling a pigment into the rubber resin before cooking it in the oil. Pigments which are non-basic in nature may be used with either a neutral or highly acid oil. Such pigments include titanium oxide, carbon black, iron oxide, silicates, zinc sulfide, chromium oxides, lithopone, and earth pigments which are largely iron oxides on a silica base. Pigments, such as zinc oxide, are to be used only with oils of low acid number.

Such a colored varnish may be made by milling together 60 parts of the rubber derivative, 40 parts of ester gum, 100 parts of titanium dioxide and 100 parts of silica, and then cooking the milled mixture into 300 parts of alkali refined linseed oil.

Instead of the chlorine-containing rubber derivative described above other condensation derivatives of rubber may be employed, such for example, as the derivative formed by boiling a solution of rubber, then adding stannic chloride and further boiling to form a tin addition compound and then splitting off the tin. The product thus obtained apparently has the formula $(C_5H_8)x$. It may be made into a cooked varnish by heating 100 parts of alkali refined linseed oil to 300 degrees F. and then cooking 30 parts of unmilled rubber derivative made by the tin tetrachloride reaction into the heated oil. The temperature of the reaction mixture is then gradually raised to about 580 degrees F. and held at this temperature until the rubber derivative goes into solution. The mixture is then cooled and cut back with 100 parts of Varnoline. If the rubber derivative is milled before being cooked into the oil somewhat lower temperatures may be employed and this is desirable where the higher temperatures char the reaction mixture. Fluxes, such as ester gum, etc. may be added and pigments and other fillers as desired.

Instead of forming the chlorine-containing rubber derivative by the chlorostannic acid reaction, stannic chloride and hydrochloric acid may be employed. The halides of other amphoteric metals may be used in the presence of hydrochloric acid or without hydrochloric acid, such as chromic chloride and ferric chloride, etc. to prepare rubber derivatives to be used in carrying out this invention. Reactions which yield a substantially colorless product are generally preferred for the formation of the rubber derivative employed in the cooked varnishes of this invention.

The varnishes of this invention are particularly designed for use on metallic surfaces although they may be applied to wood, etc. It is intended that the patent shall cover by suitable expression in the appended claims whatever features of patentable novelty reside in the invention.

What I claim is:

1. A cooked varnish which comprises a drying oil and a condensation derivative of rubber obtainable by treating rubber with a condensing agent from the group consisting of halides of amphoteric metals and chlorostannic acid.

2. A cooked varnish which comprises a drying oil, pigment and a condensation derivative of rubber obtainable by treating rubber with a condensing agent from the group consisting of halides of amphoteric metals and chlorostannic acid.

3. A cooked varnish which comprises a drying oil and a milled condensation derivative of rubber obtainable by treating rubber with a condensing agent from the group consisting of halides of amphoteric metals and chlorostannic acid.

4. A cooked varnish which comprises a flux, 100 parts by weight of alkali-refined linseed oil and up to 100 parts by weight of a condensation derivative of rubber obtainable by treating rubber with a condensing agent from the group consisting of halides of amphoteric metals and chlorostannic acid.

5. A cooked varnish which comprises a flux and a condensation derivative of rubber obtainable by treating rubber with a condensing agent from the group consisting of halides of amphoteric metals and chlorostannic acid.

6. A cooked varnish which comprises a cooked mixture of a condensation derivative of rubber and a flux in a varnish oil, said derivative being obtainable by treating rubber with a condensing agent from the group consisting of halides of amphoteric metals and chlorostannic acid.

7. The method of preparing a cooked varnish which comprises cooking a drying oil and a condensation derivative of rubber obtainable by treating rubber with a condensing agent from the group consisting of halides of amphoteric metals and chlorostannic acid.

8. The method of forming a cooked varnish which comprises milling a condensation derivative of rubber obtainable by treating rubber with a condensing agent from the group consisting of halides of amphoteric metals and chlorostannic acid, and then cooking the milled product into a drying oil.

9. The method of forming a cooked varnish which comprises cooking a flux, 100 parts of alkali-refined linseed oil and up to 100 parts of a condensation derivative of rubber obtainable by treating rubber with a condensing agent from the group consisting of halides of amphoteric metals and chlorostannic acid.

10. The method of forming a cooked varnish which comprises cooking into a varnish oil a flux and a condensation derivative of rubber obtainable by treating rubber with a condensing agent from the group consisting of halides of amphoteric metals and chlorostannic acid.

11. A surface coated with a cooked varnish containing a condensation derivative of rubber obtainable by treating rubber with a condensing agent from the group consisting of halides of amphoteric metals and chlorostannic acid.

12. A surface coated with a baked, cooked varnish containing a condensation derivative of rubber obtainable by treating rubber with a condensing agent from the group consisting of halides of amphoteric metals and chlorostannic acid.

13. The method of forming a cooked varnish which comprises milling a flux into a condensation derivative of rubber obtainable by treating rubber with a condensing agent from the group consisting of halides of amphoteric metals and chlorostannic acid, and then cooking the milled mixture into alkali-refined linseed oil.

14. The method of protecting a surface which comprises applying to the surface a cooked varnish prepared from a drying oil and a condensation derivative of rubber obtainable by treating rubber with a condensing agent from the group consisting of halides of amphoteric metals and chlorostannic acid and then baking the varnish onto the surface.

HERBERT A. ENDRES.